United States Patent [19]
Trudeau et al.

[11] Patent Number: 5,676,917
[45] Date of Patent: Oct. 14, 1997

[54] SYNTHESIS OF BETA PHASE SPHERICAL CALCIUM PYROPHOSPHATE POWDER

[75] Inventors: Leslie F. Trudeau, Waverly, N.Y.; Charles F. Chenot; Richard G. W. Gingerich, both of Towanda, Pa.

[73] Assignee: Osram Sylvania Inc., Danvers, Mass.

[21] Appl. No.: 717,056

[22] Filed: Sep. 20, 1996

[51] Int. Cl.$^6$ .................................................. C01B 25/42
[52] U.S. Cl. ................................................................ 423/305
[58] Field of Search ........................................... 423/305

[56] References Cited

U.S. PATENT DOCUMENTS

| | | | |
|---|---|---|---|
| 3,357,790 | 12/1967 | Saunders et al. | 423/305 |
| 3,407,035 | 10/1968 | Shen | 423/305 |
| 3,635,660 | 1/1972 | Bruce et al. | 423/305 |
| 3,636,352 | 1/1972 | Wanmaker et al. | 250/80 |
| 3,975,308 | 8/1976 | Myles | 423/305 |
| 4,721,615 | 1/1988 | Griffith et al. | 423/305 |

FOREIGN PATENT DOCUMENTS

| | | | |
|---|---|---|---|
| 140613 | 3/1980 | Germany | 423/305 |
| 1224 | 4/1869 | United Kingdom | 423/305 |

*Primary Examiner*—Wayne Langel
*Attorney, Agent, or Firm*—Robert F. Clark

[57] ABSTRACT

A fine, largely beta phase calcium pyrophosphate powder for, e.g., a diffuser coating for the interior surface of lamp envelopes. The powder is useful for electrostatic deposition of such coatings under varying conditions of environmental humidity. A process for the synthesis of the calcium pyrophosphate is also disclosed. Dibasic calcium orthophosphate (monetite) is dissolved in a dilute aqueous hydrochloric acid solution and spray-dried to form a calcium phosphate powder of spherically shaped hollow particles. The calcium phosphate powder is fired in air to convert the calcium phosphate powder to a spherical calcium pyrophosphate powder including the beta phase as a major component and the gamma phase as a minor component. For a diffuser coating, the poder is sonicated to fragment a portion of the hollow particles.

18 Claims, 1 Drawing Sheet

SYNTHESIS OF BETA PHASE SPHERICAL CALCIUM PYROPHOSPHATE POWDER

BACKGROUND OF THE INVENTION

The present invention relates to calcium pyrophosphate ($Ca_2P_2O_7$) powders, and particularly to the synthesis of a largely beta phase calcium pyrophosphate powder in the form of spherical particles particularly useful for electrostatic deposition to provide a light-diffusing coating on, e.g., the interior surfaces of transparent lamp envelopes.

Known tungsten incandescent lamps typically include silica diffuser coatings on the interior surface of the lamp envelope to scatter light emitted within the lamp. The silica materials used for this purpose can have a short shelf life due to their tendency to absorb moisture prior to their application to the lamp envelope. Other coatings, e.g., of silica mixtures such as diatomaceous silica are costly to prepare and purify.

Lamp envelopes for high pressure sodium vapor lamps and certain metal arc high intensity discharge lamps are presently coated with such materials as gamma phase calcium pyrophosphate or yttrium vanadate. The gamma phase calcium pyrophosphate coatings often exhibit poor adherence to the lamp envelopes, while the yttrium vanadate coatings are costly to prepare.

SUMMARY OF THE INVENTION

Accordingly, it is an object of the present invention to overcome the disadvantages of the prior art diffuser coating materials.

It is another object of the invention to provide a fine, largely beta phase calcium pyrophosphate powder in the form of generally spherical particles.

It is yet another object of the invention to provide a calcium pyrophosphate powder suitable for reliable electrostatic deposition under varying conditions of atmospheric humidity.

It is still another object of the invention to provide a calcium pyrophosphate material for diffuser coatings which exhibits improved adherence to lamp envelopes.

It is a further object of the invention to provide an efficient and cost effective process for synthesizing largely beta phase calcium pyrophosphate powder in the form of generally spherical particles.

Accordingly, in one embodiment the invention is a process for the synthesis of calcium pyrophosphate involving dissolving dibasic calcium orthophosphate in a solution of hydrochloric acid in water to form a dibasic calcium orthophosphate solution. The dibasic calcium orthophosphate solution is spray-dried to form a prefired calcium phosphate powder. The prefired calcium phosphate powder is fired in an oxidizing atmosphere, at a temperature and for a time sufficient to convert the prefired calcium phosphate powder to a calcium pyrophosphate powder including beta calcium pyrophosphate as a major component.

In another embodiment, the invention is a calcium pyrophosphate powder consisting essentially of generally spherical particles of calcium pyrophosphate, said calcium pyrophosphate including beta calcium pyrophosphate as a major component.

In yet another embodiment of the invention, the invention is a fine, beta calcium pyrophosphate diffuser coating powder of generally spherical particles.

BRIEF DESCRIPTION OF THE DRAWINGS

For a better understanding of the present invention, together with other objects, features, advantages, and capabilities thereof, reference is made to the following Description and appended Claims, together with the Drawing in which:

DETAILED DESCRIPTION OF THE PREFERRED EMBODIMENTS

Figure 1:
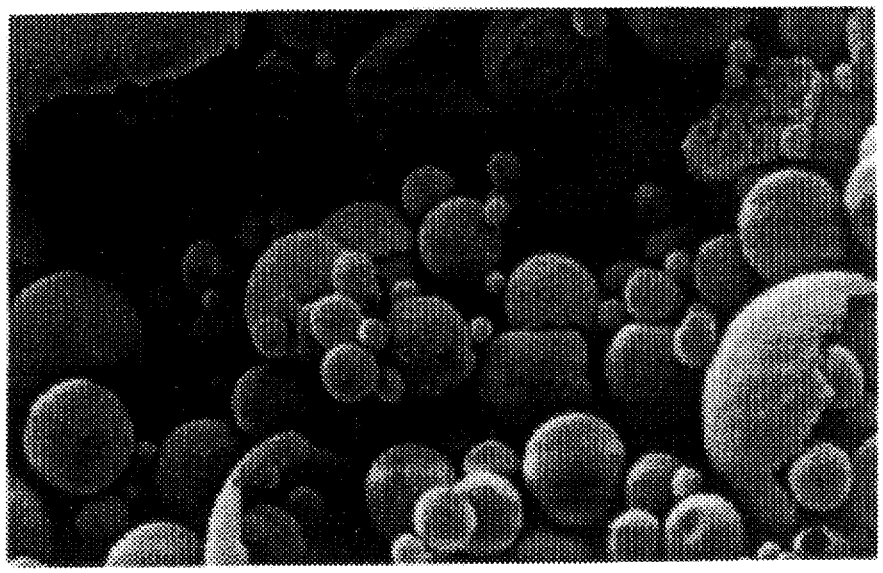
FIG. 1 is a microphotograph of a largely beta phase calcium pyrophosphate powder in accordance with one embodiment of the present invention, showing a morphology of spherical particles.

The process described herein is a spray-dry process for producing a fine, largely beta phase calcium pyrophosphate powder in the form of spherical particles. Dibasic calcium orthophosphate ($CaHPO_4$, monetite), in a form sufficiently pure for application as a diffuser coating on the interior surface of a lamp envelope, is dissolved in an aqueous acid solution and spray-dried to produce prefired particles which are generally spherical in shape. This morphology is significantly different from the nearly cubic (triclinic) crystal structure of the dibasic calcium orthophosphate starting powder.

It has been found that, in order to produce a largely beta phase, the acid should be hydrochloric acid (HCl). The proportion of acid to dibasic calcium orthophosphate powder is selected to provide at least sufficient $Cl^-$ ions (stoichiometrically) to react with the calcium and completely dissolve the powder; a slight excess of HCl, e.g., about 5 mole % excess, is preferred. If necessary, the solution strength (% dibasic calcium orthophosphate) is adjusted before atomizing to provide the desired dilute solution. The preferred atomizer uses a rotary atomizing wheel spinning at high speed to create the desired particle size and hollow particle morphology. The final solution strength, droplet density, and wheel speed may be adjusted to adjust the droplet size, and thus the powder particle size and density. The preferred final solution strength is about 1-3 Kg dibasic calcium orthophosphate per 6 liters of solution, or approximately 16%-50% by weight dibasic calcium orthophosphate. The wheel speed is selected empirically to produce a preferred fired particle size of less than 10 μm. The prefired particles are largely calcium chlorohydrophosphate (CCHP, $CaCl_2 \cdot Ca(H_2PO_4)_2 \cdot 2H_2O$).

The spherical particles are fired at a temperature and for a time sufficient to produce a largely beta phase calcium pyrophosphate powder, which is also in the form of spherical particles. Typically, the firing temperature is about 500° C.-1100° C., preferably about 600° C.-800° C., and the time, about 1-10 hours, preferably about 2-6 hours, depending on the firing temperature.

Typically, if the powder is to be used as a light diffusing coating applied to, e.g., the interior of a lamp envelope, the powder is deagglomerated by a known process, e.g., sonification to break up any agglomerated particles before use and to partially fragment the hollow powder particles. These partially fragmented hollow particles are particularly effective in scattering or diffusing light. For electrostatic deposition, the preferred particle size (average effective diameter) for the fired, deagglomerated powder is less than about 10 μm, the most preferred size, less than 8 μm.

The following description of an illustrative process is presented to enable those skilled in the art to more clearly understand and practice the present invention. This example should not be considered as a limitation upon the scope of the present invention, but merely as being illustrative and representative thereof.

EXAMPLE

A dibasic calcium orthophosphate solution is made by dissolving 2 Kg dibasic calcium orthophosphate ($CaHPO_4$, monetite) into 2 liters of reagent grade (36.5%–38% assay HCl) hydrochloric acid solution, and diluted to 6 liters with deionized water. The dibasic calcium orthophosphate solution is then spray-dried by spraying it as a fine mist at a rate of 15–20 ml/min into the atomizer chamber of a Niro rotary atomizer (manufactured by Niro, a Danish manufacturer) using a liquid transfer pump at 150 psi with the inlet temperature set at 315° C. and the outlet temperature varying between 110° C. and 125° C. The spray-dried, prefired powder is collected in a cyclone system. The spray-dried powder includes a major phase of spherically shaped particles of calcium chlorohydrophosphate ($CaCl_2.Ca(H_2PO_4)_2.2H_2O$).

Figure 2:
FIG. 2 is a microphotograph of the calcium pyrophosphate powder of FIG. 1 after sonification, showing the highly light scattering, partially fragmented, hollow particles.

The powder is then fired in alumina crucibles in air at 700° C. for about 4 hours. A typical particle morphology for the fired powder after deagglomeration is shown in FIG. 1, which shows spherical particles similar to the spray-dried powder before firing. The x-ray diffraction pattern for the fired powder shows that the prefired powder is converted to beta calcium pyrophosphate with a small amount of gamma calcium pyrophosphate included. Examination of the fired powder by scanning electron microscope, after sonification, shows the spherical particles to be hollow and partially fragmented, as shown in FIG. 2.

Similar runs are made varying the temperature between about 600° C. and about 800° C. and varying the time between about 2 hours and about 6 hours. The times and temperatures result in the production of a spherical powder of largely beta phase calcium pyrophosphate powder made up of hollow spherical particles. Sonification of these powders results in partial fragmentation of the hollow spheres of the powder to improve its light diffusing characteristics.

The invention described herein presents to the art a novel, improved process for synthesizing a fine, spherical, largely beta phase calcium pyrophosphate powder for, e.g., diffuser coatings for the interior surfaces of lamp envelopes. The process efficiently and economically produces the beta form of the pyrophosphate powder, of a spherical morphology suitable for reliable electrostatic deposition under a variety of conditions of environmental humidity. The powder exhibits improved shelf-life over prior art silica coatings, and improved adherence to the lamp envelope over other forms of calcium pyrophosphate.

While there has been shown and described what are at present considered the preferred embodiments of the invention, it will be apparent to those skilled in the art that modifications and changes can be made therein without departing from the scope of the present invention as defined by the appended Claims.

We claim:

1. A process for the synthesis of calcium pyrophosphate comprising:

dissolving dibasic calcium orthophosphate in an aqueous solution of hydrochloric acid to form a dibasic calcium orthophosphate solution;

spray-drying said dibasic calcium orthophosphate solution to form a prefired calcium phosphate powder;

firing said prefired calcium phosphate powder in an oxidizing atmosphere, at a temperature and for a time sufficient to convert said prefired calcium phosphate powder to a calcium pyrophosphate powder including beta calcium pyrophosphate as a major component.

2. A method in accordance with claim 1 wherein the strength of said dibasic calcium orthophosphate solution is about 16–50 weight % dibasic calcium orthophosphate.

3. A method in accordance with claim 1 wherein said hydrochloric acid solution is of a strength selected to provide at least sufficient $Cl^-$ ions (stoichiometrically) to completely dissolve said dibasic calcium orthophosphate.

4. A method in accordance with claim 1 wherein said dibasic calcium orthophosphate solution is spray-dried at about 100° C.–350° C.

5. A method in accordance with claim 1 wherein said prefired calcium phosphate powder includes spherically shaped hollow particles of calcium chlorohydrophosphate as at least a major phase of said powder.

6. A process in accordance with claim 1 wherein said oxidizing atmosphere is air.

7. A process in accordance with claim 1 wherein said calcium phosphate powder is fired at a temperature of about 600° C.–800° C.

8. A process in accordance with claim 7 wherein said calcium phosphate powder is fired for a time of about 2–6 hours.

9. A process in accordance with claim 8 wherein said firing comprises firing said calcium phosphate powder in air at about 700° C. for about 4 hours.

10. A process in accordance with claim 1 further comprising deagglomerating said calcium pyrophosphate powder and fragmenting a portion of said hollow spherical particles.

11. A calcium pyrophosphate powder consisting essentially of generally spherical particles of calcium pyrophosphate, said calcium pyrophosphate including beta calcium pyrophosphate as a major component.

12. A calcium pyrophosphate powder in accordance with claim 11 wherein said calcium pyrophosphate further includes gamma pyrophosphate as a minor component.

13. A calcium pyrophosphate powder in accordance with claim 11 wherein said particles have an average effective diameter of less than about 10 μm.

14. A calcium pyrophosphate powder in accordance with claim 11 wherein a major portion of said spherical particles are hollow.

15. A powder comprising generally spherical particles of calcium pyrophosphate, wherein said calcium pyrophosphate includes beta calcium pyrophosphate as a major component, and said particles have an average effective diameter of less than about 10 μm.

16. A powder in accordance with claim 15 wherein said particles have an average effective diameter of less than about 8 μm.

17. A powder in accordance with claim 15 wherein a major portion of said spherical particles are hollow.

18. A powder in accordance with claim 17 wherein said powder is a diffuser coating powder and a portion of said hollow spherical particles are fragmented.

* * * * *